Feb. 6, 1940.  C. A. BENNETT  2,189,099

DRYING SYSTEM FOR SEED COTTON

Filed Oct. 15, 1937

INVENTOR
Charles Abel Bennett
ATTORNEYS

Patented Feb. 6, 1940

2,189,099

UNITED STATES PATENT OFFICE 2,189,099

DRYING SYSTEM FOR SEED COTTON

Charles Abel Bennett, Stoneville, Miss., dedicated to the free use of the People of the United States of America Application October 15, 1937, Serial No. 169,158

1 Claim. (Cl. 34—34)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States for governmental purposes without the payment to me of any royalty thereon.

I hereby dedicate the invention herein described to the free use of the People of the United States of America to take effect on the granting of a patent to me.

My invention relates to improvements in apparatus for drying seed cotton in which a vertical drier and a certain process, both developed by the United States Department of Agriculture for drying seed cotton, are utilized in conjunction with newly developed means for supplying damp seed cotton to said drier and means for discharging the dried cotton therefrom to a point directly beneath the source of supply.

The vertical drier above referred to is described in Patent No. 1,871,773, which was issued to me on August 16, 1932, and the said process for drying seed cotton, which has been in public use since the year 1928, is described in Miscellaneous Publication No. 239 under the title "The vertical drier for seed cotton" and in Technical Bulletin No. 508 under the title "Effect of artificially drying seed cotton before ginning on certain quality elements of the lint and seed and on the operation of the gin stand", issued from the Cotton Ginning Laboratories of the Department of Agriculture. The process referred to for drying seed cotton comprises the treating of damp seed cotton with from 40 to 100 cubic feet of hot air per pound of damp seed cotton, during an exposure period of from several seconds to three minutes, with a temperature of the heated air preferably between 150 degrees and 200 degrees Fahrenheit.

By my present invention, which incorporates certain modifications at the base of the vertical drier in combination with other apparatus hereinafter described, I have greatly extended the adaptability of the drier and drying process to cotton gins whose separators, distributors, and housing facilities necessitate types of installations that differ materially from those heretofore used. The drives and construction of new forms of separators often prevent the dropping of damp seed cotton into a conveying pipe if its axis is parallel to that of the seed dropper wheel of the separator. The latest forms of distributors, such as the screw and gyrator types, further necessitate the return of dried cotton directly beneath the separator, if the drying system is to be made integral with the ginning system without duplicating parts, because these new distributors operate in one direction only and consequently can be fed from one end only to supply the entire battery of ginning units.

The increased use of stationary overflow pipes in lieu of a flexible overflow telescope also makes it somewhat difficult to arrange pipes for drawing the dried cotton from the base of the vertical drier thereto. These and other difficulties involved in installations of new drying systems at existing cotton gins are largely overcome by my present invention with its cross-blow jet and pressure discharge, which permit a wide range of selection in drier height and location at the cotton gin and with which the drying system may be quickly cut in or out of service in a simple manner.

To avoid misunderstanding of cotton ginning terms herein employed, the following definitions and explanations are herewith given: A "separator" is herein considered to be synonymous with an "air seal dropper" and is sealed mechanically by a series of flaps on a partitioned cylinder called a "vacuum wheel" or "sealed dropper-wheel". The "hot blast" of the drying system is the continuous supply of heated air from the drying fan and heater by means of which the damp cotton is removed from the separator discharge and dried in the drier. The foregoing and other terms as herein used are those commonly employed in the art, and are more fully described in Farmers' Bulletin No. 1748 under the title "Ginning cotton", issued in August, 1935, by the United States Department of Agriculture.

Prior to my present invention, the damp seed cotton was customarily conveyed to and through the drier in the hot blast which passed beneath and parallel to the axis of the separator. After the dried cotton was discharged from the base of the vertical drier, it was drawn into the overflow suction piping of the cotton gin in some instances, or was discharged by gravity into a cleaner or distributor in others. In the latter cases the vertical driers were elevated above the ginning apparatus, while in the former cases they were located on the ground level in a restricted position adjacent to the overflow piping of the cotton gin. My invention provides a new method of removing the damp seed cotton from the separator discharge by the use of a jet at right angles to the face of the separator, and it also eliminates the screened hopper at the base of the vertical drier, thus providing a combined feeding and return apparatus of practical utility. This apparatus has been fully tested by the U. S. Cotton Ginning Laboratories at a number of cooperative commercial ginning establishments. My invention is also applicable to systems having cleaners interposed between the separator and distributor, because it permits delivery to a cleaner as satisfactorily as it does to a distributor.

Experimentally, I have found it possible to substitute an air tight bottom hopper for the screened one customarily used on the vertical drier, and by the use of slightly more pressure from the drying fan to blow the dried cotton from the drier to any point in the cotton gin, in a manner similar to using a hose and spray, whereby one drier could serve any one of several ginning batteries. My present system thus becomes a pressure system throughout the entire drying and delivery cycle. The special cross-blow hot-blast jet, which acts at right angles to the axis of the separator vacuum wheel, eliminates conflict and interference with belts or drives and permits service in cramped or restricted spaces much better than previous methods.

One of the objects of my invention is to broaden the use of the vertical drier and present drying processes by new methods of installation.

Another object of my invention is to provide means for supplying damp cotton to and returning dried cotton from the drier to the same place in the cotton ginning apparatus.

Other objects of my invention are to provide means of particular suitability for direct delivery of dried cotton to the screw distributor or overhead cleaner in a cotton gin without complicated apparatus, and to provide means for readily by-passing the drier when desired.

A further object of my invention is to render one drier available to any one of several ginning batteries from one optimum position by means of selective blow pipe connections to said batteries.

I attain these objects by the apparatus for drying seed cotton illustrated in the accompanying drawing, in which.

Figures 2, 3:
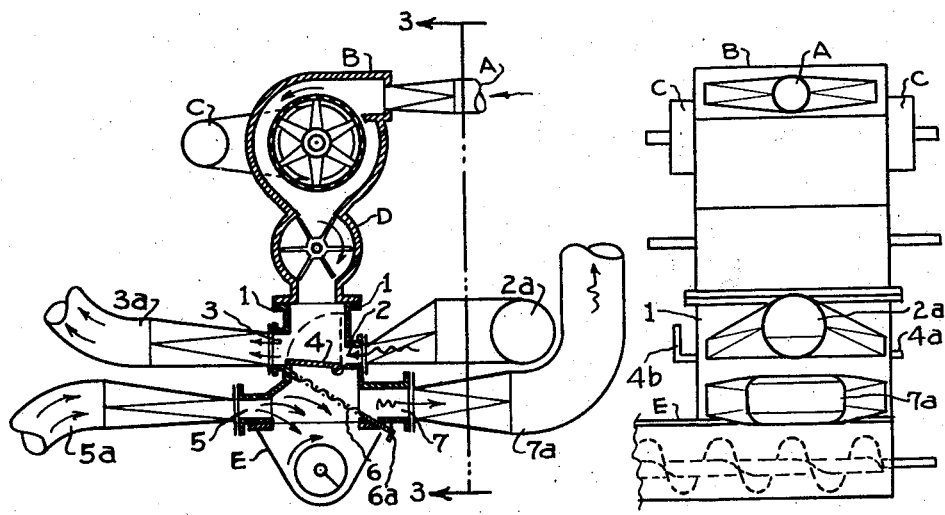
Figure 2 is a sectional elevational view of the jet and return box.
Figure 3 is a front cross-sectional elevational view taken along the line 3—3 of Figure 2.
Figure 1:
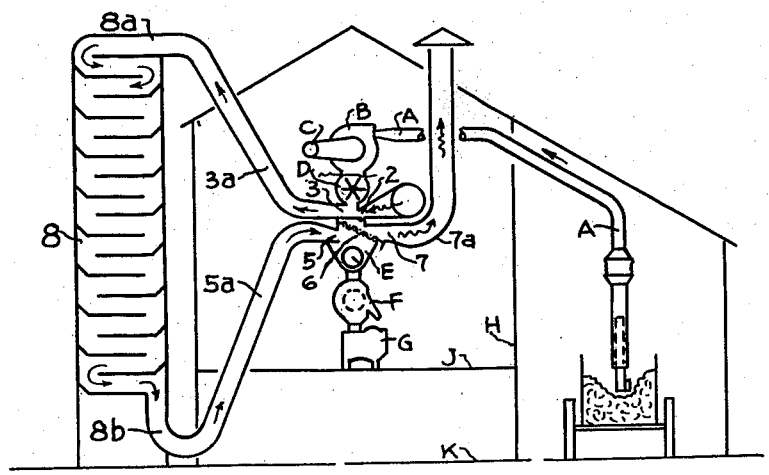
Figure 1 is a diagrammatic elevational view of the drying system and cotton ginning machinery.

Referring with more particularity to the drawing, in which like numerals designate like parts, the cotton handling and drying system, delineated in Figure 1, comprises a seed cotton suction piping A; a separator B, from which air is exhausted to a fan (not shown) through the suction manifold C; a vacuum wheel D; a jet and return box I; a distributor E; feeders F; and cotton gins G. All of these parts are positioned within a gin house H, on floor J, which frequently is above the ground level K. They are used in modern cotton gins and should be familiar to those versed in the art of ginning. Interposed between the vacuum wheel D and the distributor E is the jet and return box I, the construction of which is shown in Figure 2. It comprises a jet opening 2, a receiving opening 3, an air tight damper 4, a return opening 5, a removable screen or foraminous plate 6, and a vent opening 7. The hot blast pipe 2a connected to a heater and drier fan (not shown), the damp cotton conveying pipe 3a, the dried cotton return pipe 5a, and a vent pipe 7a are all connected in an air tight manner to respective openings in the box I which they serve, substantially as shown. The damper is hingedly mounted on a rod 4a so that it may be placed in either a horizontal or a vertical position by manipulation of the damper lever 4b. Said damper 4 may be of the sliding type instead of the hinged type if desired.

The removable screen or foraminous plate 6 is disposed by suitable means (not shown) and may be removed from the box I by pulling on the extended portion 6a. For practical purposes all parts of the box I and parts designated by the numerals 2, 3, 4, 5, 6, and 7 are preferably of metal.

For the average cotton gin the piping 2a, 3a, and 5a are approximately 14 to 16 inches in diameter and the area of jet 2 is equal to the cross-section of the hot blast piping, while the area of the receiving opening 3 opposite the jet 2 is approximately twice as great as that of the jet 2. The area of opening 5 is ordinarily proportioned to be equal to opening 3, and it is desirable that vent opening 7 be made twice as large in area as opening 5. The usual lengths of these several openings vary from 45 to 72 inches, depending upon the make of separator. The usual width of the top aperture of the box I is 16 inches, and the total height of the box I is usually 32 inches.

The inlet 8a of the vertical drier 8 is conventional, but the outlet hopper or funnel 8b is to be made air tight for collecting and blowing the dried cotton through the pipe 5a. It will be seen that with this method of delivery and discharge the vertical drier can be readily placed on the ground K or on or above the gin floor J, and that it could dispose of its dried cotton to any of several branches (not shown) by means of valves (not shown) leading from the pipe 5a. The height of the drier is therefore immaterial.

The operation of my apparatus is as follows: Damp cotton is dropped from the separator's vacuum wheel D into the box I upon the damper 4, where the hot blast blowing through jet 2 sweeps the damp cotton into the opening 3 and, thence, to the vertical drier 8. At the base of the vertical drier 8, the dried cotton is collected in the discharge hopper 8b and is then blown through pipe 5a into opening 5 of the box I. Here the dried cotton drops into a cleaner (not shown) or into the distributor E, while the moisture laden drying air is vented at atmospheric pressure through the screen 6 and vent opening 7 into the vent pipe 7a. Any small amount of hot air that might stray into the distributor with the dried cotton is therefore incidental leakage and produces neither pressure nor drying. The screen 6 prevents loss of seed cotton into the vent and also acts as a deflector for such cotton as may impinge upon it.

When it is desired to by-pass the drying apparatus, the hot blast is discontinued, the damper 4 is swung into a vertical position and the screen 6 is removed, thereby permitting the cotton to fall directly from the separator B and the vacuum wheel D to the distributor E. It is immaterial to the scope and objectives of my invention whether the screen 6 is a sliding or hinged apparatus, since both operate satisfactorily.

It is to be understood that variations in the construction of the jet box, or in the proportions and positions of the jet or other parts, may be effected within the scope of the appended claim without departing from the spirit of my invention.

Having thus described my invention, I claim:

An improved apparatus for conveying seed cotton to a distributor either directly or through a drier comprising the combination with a drier, a distributor, a source of hot air under pressure, and an air seal dropper, said dropper having a vacuum wheel and a gravity outlet communicating with said wheel; of a chamber hermetically secured to the bottom of said outlet, a valved passage through the bottom of said chamber communicating with the inlet of said distributor and the outlet of said drier, a removable foraminous wall between said passage and both the outlet of said distributor and the outlet of said drier, said chamber having a horizontal outlet communicating with the intake of said drier, and a horizontal nozzle inlet, opposite the outlet, connected to said source of air under pressure.

CHARLES ABEL BENNETT.